(12) United States Patent
Koide

(10) Patent No.: US 6,445,656 B1
(45) Date of Patent: Sep. 3, 2002

(54) OPTICAL RECORDING/REPRODUCING METHOD AND APPARATUS FOR OPTICAL STORAGE MEDIA

(75) Inventor: Hiroshi Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 56 days.

(21) Appl. No.: 09/678,378

(22) Filed: Oct. 3, 2000

Related U.S. Application Data

(63) Continuation-in-part of application No. 09/547,861, filed on Apr. 12, 2000.

(30) Foreign Application Priority Data

Apr. 13, 1999 (JP) .......................................... 11-105476

(51) Int. Cl.⁷ .............................................. G11B 7/00
(52) U.S. Cl. ............................... 369/47.28; 369/59.2
(58) Field of Search ..................... 369/47.28, 47.31, 369/47.27, 47.43, 43.32, 53.31, 59.12, 59.19, 59.2

(56) References Cited

U.S. PATENT DOCUMENTS

| | | | | |
|---|---|---|---|---|
| 4,949,325 A | * | 8/1990 | Tsuyoshi et al. | 369/47.28 |
| 5,559,775 A | * | 9/1996 | Matsueda | 369/59.2 |
| 5,559,777 A | * | 9/1996 | Maeda et al. | 369/47.5 |
| 5,590,106 A | * | 12/1996 | Shimizume et al. | 369/47.42 |
| 5,920,530 A | * | 7/1999 | Kuroda et al. | 369/47.32 |
| 5,956,307 A | * | 9/1999 | Koudo et al. | 369/47.43 |
| 6,028,828 A | * | 2/2000 | Maeda | 369/47.48 |
| 6,088,311 A | * | 7/2000 | Katoh | 369/47.18 |
| 6,101,154 A | * | 8/2000 | Kim | 369/13.54 |
| 6,272,088 B1 | * | 8/2001 | Aramaki et al. | 369/53.24 |

FOREIGN PATENT DOCUMENTS

| | | | |
|---|---|---|---|
| JP | 55132155 A | * | 10/1980 |
| JP | 61190743 A | * | 8/1986 |
| JP | 9-219022 | | 8/1997 |
| JP | 2720876 | | 11/1997 |
| JP | 10-293926 | | 11/1998 |

\* cited by examiner

*Primary Examiner*—Thang V. Tran
(74) *Attorney, Agent, or Firm*—Dickstein Shapiro Morin & Oshinsky LLP

(57) ABSTRACT

The object of the present invention is to provide an optical recording/reproducing method and apparatus that accurately record data blocks onto an optical disk in a seamless formation while effectively reducing the deterioration of recording properties of the disk. The recording properties of the disk may deteriorate when data is repeatedly written to a same data block of the disk. In the optical recording/reproducing method and apparatus of the invention, a read clock signal is generated in response to recorded data on an optical storage medium. A write clock signal is generated in response to a position information carrying signal detected from the storage medium. A phase difference between the read clock signal and the write clock signal is detected when writing data blocks to the storage medium in a seamless formation. It is determined whether a phase of the write clock signal is delayed or advanced based on the phase difference. In the optical recording/reproducing method and apparatus, a control signal is produced to adjust a phase of the position information carrying signal.

3 Claims, 7 Drawing Sheets

OPTICAL RECORDING/REPRODUCING METHOD AND APPARATUS FOR OPTICAL STORAGE MEDIA

This is a continuation-in-part of U.S. patent application Ser. No. 09/547,861, filed Apr. 12, 2000, the entire disclosure of which is incorporated herein by reference.

BACKGROUND OF THE INVENTION

1. Field of the Invention

The present invention relates to an optical recording/reproducing method and apparatus for recording information onto and reproducing information from a phase-change storage medium, such as a DVD-rewritable.

2. Description of the Related Art

DVDs (digital versatile disks) are read-only optical recording media and have their rewritable equivalents, DVD-rewritable disks. DVD-rewritable disks are phase-change storage media that use a process called the phase change technology to write and erase data.

The process writes data to a DVD-rewritable disk by focusing a high-intensity laser beam on a layer of a phase-change material embedded in a plastic base or a substrate of the disk. In its original state of the phase-change material, this layer has a rigid crystalline structure. The laser beam selectively heats areas of a surface portion of the disk to a high temperature. Where the beam strikes, the heat melts the crystals to a non-crystalline, or amorphous phase. These areas reflect less light than the unchanged area surrounding them.

Later, when a weaker laser beam, used only to read data from the recorded disk, strikes the non-crystalline area, the beam is scattered and hard to be picked up by the light-sensitive diode in the read head of the disk drive. With the lower reflectance, these areas become marks, representing "1"s. Areas that are not heated are more reflective areas, representing "0"s. When the read laser beam strikes the areas, it is reflected directly to the light-sensitive diode of the read head, creating an electrical current that is sent to the controller in the drive. The controller interprets the pattern of electrical pulses, decodes the data that they represent, checks the data for error, and sends the data to a computer.

To erase data or to change a mark back to crystalline phase, DVD-rewritable disk drives use a lower-energy laser beam to heat marked areas to a comparatively low temperature. This amount of heat is below the melting point of the phase-change material, but it still loosens up the phase change media so that it can recrystallize to its original state.

Recently, there is the demand for using a DVD player or the like to reproduce data from a DVD-rewritable disk (or a phase-change storage medium). The DVD player is originally designed to use a laser beam to read the pits of DVD or DVD-ROM disks (or the read-only optical storage media). On the read-only optical storage media, various data blocks are recorded in a seamless formation. If data blocks are recorded on the phase-change medium in a seamless formation that is essentially the same as that of the read-only optical storage media, data can be easily reproduced from the phase-change medium by using the DVD player without a need for substantial changes of the DVD player. This will increase the operability and compatibility of DVD-rewritable media, which considerably benefits the users.

Generally, in optical disk drives using the phase-change media, if data is repeatedly written to a same data block on the phase-change disk, the recording properties of the disk will deteriorate and a defect in the data block will take place. In such a case, the optical disk drives do not effectively reproduce the data from the disk. There are three types of the deterioration pattern that may be revealed in the phase-change media.

The first type is that, if data is repeatedly written to a head end of one data block, defective areas are transferred from the head end of the data block to the following areas in the forward direction. The second type is that, if data is repeatedly written to a tail end of one data block, defective areas are transferred from the tail end of the data block to the preceding areas in the backward direction. The final type is that, if a same pattern of marks is repeatedly recorded onto a same position of one data block, defective areas are transferred from that position in both the forward direction and the backward direction.

The larger the energy of the laser beam applied to overwrite recording marks at the same position of the phase-change disk, the severer the deterioration of the recording properties of the disk.

In order to eliminate the above problem, a conventional optical recording/reproducing apparatus is configured to vary the position of each complete data block in the disk when overwriting data. See, for example, Japanese Patent No.2720876 (which corresponds to Japanese Laid-Open Patent Application No.9-180191). However, the changes of the position of each complete data block is unsuitable for an optical disk drive that records data blocks onto the optical disk in a seamless formation. In the conventional apparatus, the sync positions of data blocks are greatly shifted from each other and it is difficult to create a read clock signal the phase of which is accurately synchronized with the read clock signal of the following data block when reproducing data from the optical disk.

In order to eliminate the above problem, another conventional optical recording/reproducing apparatus is configured to add dummy data to the head end and tail end of each data block and vary the position of the entire data block in the disk so as to protect the recorded data. See, for example, Japanese Laid-Open Patent Application No.9-219022. However, the changes of the position of the entire data block are unsuitable for an optical disk drive that records data blocks onto the optical disk in a seamless formation.

Another conventional optical recording/reproducing apparatus is configured to produce a write clock signal precisely synchronized with rotation of an optical disk. See, for example, Japanese Laid-Open Patent Application No.10-293926. However, the write clock signal produced is unsuitable for an optical disk drive that records data blocks onto the optical disk in a seamless formation. It is difficult for the above conventional apparatus to create a read clock signal the phase of which is accurately synchronized with the read clock signal of the following data block when reproducing data from the optical disk.

In addition, in the above conventional apparatus, when reproducing data from the optical disk, there is a problem in that the phase of the read clock signal obtained from the preceding data block and the phase of the read clock signal obtained from the next data block are apart from each other by nearly 180 degrees. It is highly possible that the data recorded at the boundaries between the adjacent data blocks on the optical disk are lost.

As described above, in the above-mentioned conventional apparatuses, the gaps between adjacent data blocks are provided, or the dummy data are added to the head end and tail end of each of the data blocks. It is difficult for the above-mentioned conventional apparatuses to record data blocks onto the phase-change disk in a seamless formation while effectively reducing the deterioration of the recording properties of the disk.

SUMMARY OF THE INVENTION

In order to overcome the problems described above, preferred embodiments of the present invention provide an improved optical recording/reproducing method and apparatus that accurately records data blocks onto the phase-change disk in a seamless formation while effectively reducing the deterioration of the recording properties of the disk.

According to one preferred embodiment of the present invention, an optical recording/reproducing method for accessing an optical storage medium in which binary data are recorded by applying a light beam to a recording layer of the storage medium and changing a state of the recording layer on a disk drive, includes the steps of: receiving a data signal to record a sequence of data blocks onto the storage medium, each data block having a predetermined block length from one end of the data block to the other end; varying each of the data blocks in length such that data bits are arbitrarily added to or removed from at least one of the ends of the data block in order to allow the data blocks to be written to the storage medium in a seamless formation, the data bits having a predetermined length; and recording the resulting data blocks on the storage medium at fixed positions.

In the optical recording/reproducing method of the above preferred embodiment, the data blocks are recorded onto the optical disk in the seamless formation, and the optical recording/reproducing method is effective in accurately recording data blocks onto the phase-change disk in a seamless formation and in reducing the deterioration of the recording properties of the disk.

According to another preferred embodiment of the present invention, an optical recording/reproducing method for accessing an optical storage medium includes the steps of: receiving a data signal to record a sequence of data blocks onto the storage medium, each data block on the storage medium having a predetermined block length from one end of the data block to the other end and being divided into a number of frames each of which has an information unit that always appears at a same position within the frame with a fixed length when recording of data onto a same portion of the storage medium is repeated; and forming, when marks are recorded onto the storage medium, the information unit of each of the frames in the sequence of data blocks such that the information unit consists of marks of a plurality of sub-units.

The optical recording/reproducing method of the above preferred embodiment is effective in reducing the deterioration of the recording properties of the optical disk on which data blocks are recorded in a seamless formation. It is possible to increase the recording repeatability and the operational life of the optical disk.

According to another preferred embodiment of the present invention, an optical recording/reproducing method for accessing an optical storage medium in which binary data are recorded by applying a light beam to a recording layer of the storage medium and changing a state of the recording layer on a disk drive, includes the steps of: calibrating the disk drive with the storage medium so that a phase error of a readout signal relative to a phase of a recording pulse based on a position-information carrying signal obtained from the storage medium is detected; and adjusting the phase of the recording pulse so as to reduce the phase error of the readout signal.

In the optical recording/reproducing method of the above preferred embodiment, the read clock signal and the write clock signal can accurately accord in phase, and it is possible to prevent the occurrence of a read error when reproducing data from the disk.

According to another preferred embodiment of the present invention, an optical recording/reproducing apparatus for accessing an optical storage medium includes: a read clock generating unit for generating a read clock signal in response to recorded data on the storage medium; a write clock generating unit for generating a write clock signal in response to a position-information carrying signal detected from the storage medium; a detection unit for detecting a phase difference between the read clock signal and the write clock signal when writing data blocks to the storage medium in a seamless formation; and a determination unit for determining whether a phase of the read clock signal is delayed or advanced based on the phase difference detected by the detection unit, wherein the determination unit produces a control signal to adjust a phase of the position-information carrying signal.

In the optical recording/reproducing apparatus of the above preferred embodiment, when the optical disk is recorded in a seamless formation, the read clock signal and the write clock signal can accurately accord in phase, and it is possible to prevent the occurrence of a read error when reproducing data from the disk.

BRIEF DESCRIPTION OF THE DRAWINGS

Other objects, features and advantages of the present invention will become apparent from the following detailed description when read in conjunction with the accompanying drawings in which.

DETAILED DESCRIPTION OF PREFERRED EMBODIMENTS

A description will now be provided of preferred embodiments of the present invention with reference to the accompanying drawings.

Figure 1:
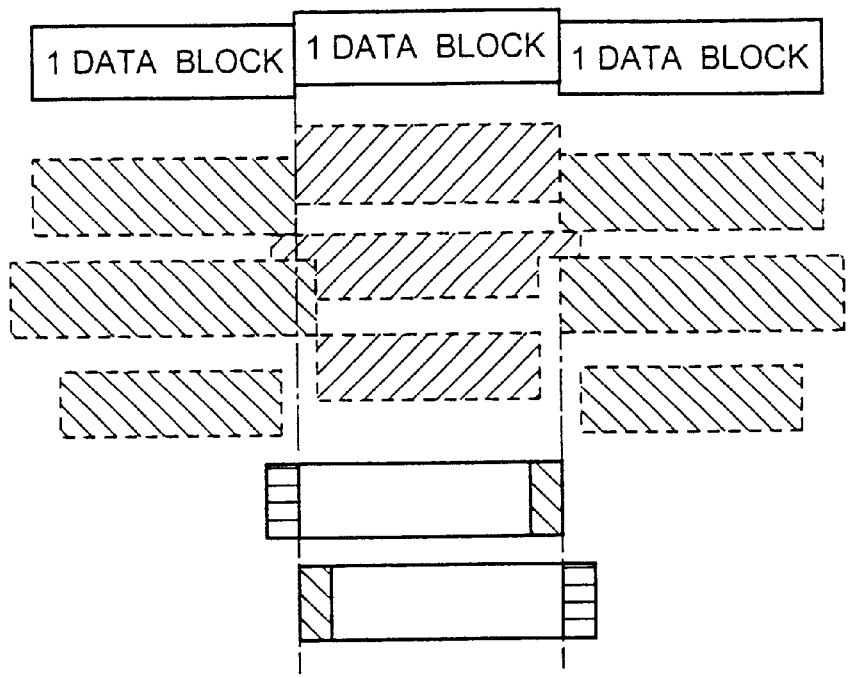
FIG. 1 is a diagram for explaining a recording format of an optical disk used by one preferred embodiment of the optical recording/reproducing method of the invention.

FIG. 1 shows a recording format of an optical disk used by one preferred embodiment of the optical recording/reproducing method of the invention.

In the optical recording/reproducing method of the present embodiment, information is written to or read from a phase-change storage medium, such as a DVD-rewritable disk. When writing the storage medium, a data signal to record a sequence of data blocks onto the storage medium is received, and each data block has a standard block length from a head end of the data block to a tail end of the data block. Specifically, in the present embodiment, the standard block length of each data block is, for example, 619008T (=16×26×1488T) where T indicates a unit length corresponding to a channel bit.

In the optical recording/reproducing method of the present embodiment, each of the data blocks is arbitrarily varied in length such that data bits are added to or removed from at least one of the head end and the tail end of each data block in order to allow the resulting data blocks to be written to the storage medium in a seamless formation.

When some portion of one of the data blocks is destroyed by the overwriting of the data bits to the head-end and/or the tail-end of the neighboring data block, an error correcting code (ECC) process is performed thereafter so that such a portion of the data block can be corrected so as to recover the original data thereof.

This seamless formation is essentially the same as that of the read-only optical storage media, such as DVD or DVD-ROM. The data blocks are written to the storage medium as indicated by the shaded areas in FIG. 1. The data portions of the respective data blocks are written to the optical disk at fixed positions within each data block, although the block length is varied.

Further, in the optical recording/reproducing method of the present embodiment, even when a start position shift (SPS) process is performed on the data blocks, the fixed positions of the data blocks to be written to the storage medium remain unchanged.

The data bits, which are individually added to or removed from the head end and/or the tail end of the respective data blocks, have a predetermined length. Specifically, in the present embodiment, the predetermined length of the data bits is, for example, 512T or smaller. However, in the optical recording/reproducing method of the present embodiment, when a same portion of the storage medium is written to with the data bits two or more times, the predetermined length of the data bits may be varied at random for each time. In such a case, the randomly changed length of the data bits must be smaller than 512T.

When the data bits are added to a data block, a block length of the modified data block is increased from the standard block length by the length of the data bits added. When the data bits are removed from a data block, a block length of the modified data block is decreased from the standard block length by the length of the data bits removed.

Then, in the optical recording/reproducing method of the present embodiment, the resulting data blocks are written to the storage medium at the fixed positions. Although the block length is varied, the fixed positions of the data blocks (or the fixed positions of recorded data and synchronization information) to be written to the storage medium remain unchanged after the change of the block length of each data block.

For example, when reproducing the recorded data from the storage medium, the positions of the data and the synchronization information which are fixed on the storage medium can be obtained or easily predicted, so that an accurate read clock signal used to reproduce the recorded data can be produced. Accordingly, if an existing DVD player is used to reproduce data from the phase-change storage medium that has been recorded in the seamless formation by using the optical recording/reproducing method of the present embodiment, it is possible to easily reproduce the data from the storage medium.

As described, in the optical recording/reproducing method of the present embodiment, when a same portion of the storage medium is written to with the data bits two times or more, the predetermined length of the data bits is varied at random for each time.

Further, in the optical recording/reproducing method of the present embodiment, when the data bits having the predetermined length are added to one of the data blocks two or more times, binary values of the data bits are shifted at random for each time.

Therefore, it is possible for the optical recording/reproducing method of the present embodiment to prevent the occurrence of a read error due to the previously-described deterioration pattern types (1) and (2) in which data is repeatedly written to the head end of one data block or data is repeatedly written to the tail end of one data block. Hence, the optical recording/reproducing method of the present embodiment is effective in accurately recording data blocks onto the phase-change disk in a seamless formation while reducing the deterioration of the recording properties of the storage medium.

Further, it is possible for another preferred embodiment of the optical recording/reproducing method of the invention to prevent the occurrence of a read error due to the previously-described deterioration pattern (3) in which a same pattern of marks is repeatedly recorded onto a same position of one data block.

Figure 2:
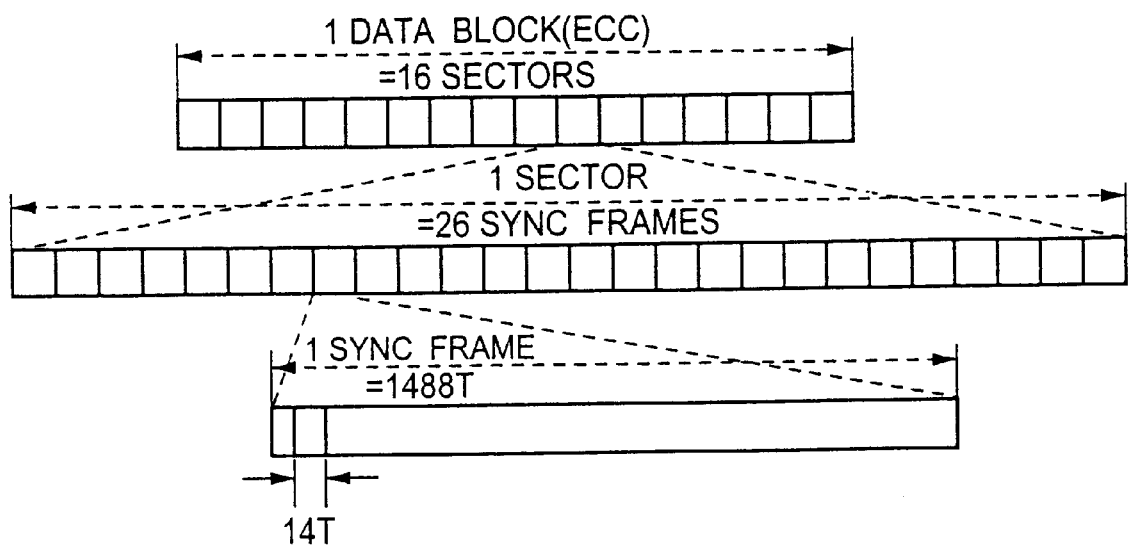
FIG. 2 is a diagram for explaining a structure of data block used by the optical recording/reproducing method of the present embodiment.
Figure 3:
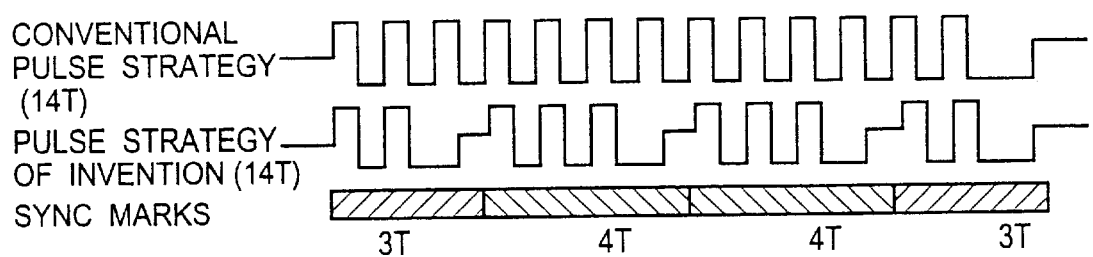
FIG. 3 is a time chart for explaining a recording pulse pattern used by the optical recording/reproducing method of the present embodiment.

Next, a description will be provided of the optical recording/reproducing method of the present embodiment with reference to FIG. 2 and FIG. 3.

FIG. 2 shows a structure of data block used by the optical recording/reproducing method of the present embodiment.

As shown in FIG. 2, one of the data blocks, which are recorded on the phase-change storage medium (the DVD-rewritable) in the present embodiment, is made up of 16 sectors. One data block is also called an ECC (error correcting code) block. One sector is a made up of 26 sync frames. One sync frame has a predetermined length corresponding to 1488T where T indicates a unit length corresponding to a channel bit, and the standard block length of each data block in the present embodiment is 619008T (=16×26×1488T). Each of the 26 sync frames, within one of the 16 sectors for one data block, includes a sync information unit (hereinafter called sync marks) at a same position within the sync frame, and the sync marks (or the sync information unit) have a fixed length 14T, as shown in FIG. 2. The sync marks are a pattern of sync control bits to provide the synchronization information for each sync frame, and this pattern always appears at the same position within each of the sync frames with the same fixed length even when different data is recorded onto a same portion of the storage medium repeatedly.

According to the data format of the standard storage medium (or the DVD-rewritable), the sync marks (14T), which appear at the same position within each sync frame, are set to either recorded data bits (the marks) having a length of 14T or non-recorded data bits (the spaces) having a length of 14T. In other words, the sync marks (14T) in each sync frame, having the same value, appears at the same position within each sync frame with the fixed length, but the other areas of the sync frame contain the marks (the recorded data bits) or the spaces (the non-recorded data bits) at random which may have a different length and a different value.

As previously described, if the same pattern of the sync marks is repeatedly recorded onto the same position of each sync frame for one data block, defective areas may be transferred from that position in both the forward direction and the backward direction as in the deterioration pattern (3).

In order to eliminate the above problem, in the optical recording/reproducing method of the present embodiment, a randomly-selected one of a plurality of predetermined patterns each of which includes at least two kinds of mark with different lengths is provided for a recording pulse pattern of the sync marks (14T), and each time the recording of data onto the same portion of the storage medium is repeated, the marks of sub-units, contained in the sync marks (the sync information unit), are changed by the randomly selected one of the plurality of predetermined patterns, and the entire length of the sync information unit remains unchanged.

FIG. 3 shows a recording pulse pattern used by the optical recording/reproducing method of the present embodiment. In FIG. 3, a conventional pulse strategy and a pulse strategy of the present embodiment are illustrated for explaining the recording pulse pattern used when the recording of data onto a same portion of the storage medium is repeated. The conventional pulse strategy includes a sequence of regularly oscillating pulses (14T). The pulse strategy of the present embodiment includes a combination of at least two sub-units 3T and 4T having different lengths, each of the sub-units having varying ON/OFF states in a predetermined formation. The jitter for the entire pulse strategy of the present embodiment is substantially the same as that of the conventional pulse strategy. In other words, an entire length (14T) of the sync marks for each of a plurality of predetermined patterns, used by the optical recording/reproducing method of the present embodiment, remain unchanged.

Specifically, the recording pulse pattern of the present embodiment, shown in FIG. 3, is made up of one of the plurality of the predetermined patterns of the sub-units (3T, 4T, 4T, 3T). 3T is the smallest length according to the data format of the DVD-rewritable in the present embodiment. The plurality of predetermined patterns, which are provided for the recording pulse pattern of the sync marks in the present embodiment, may include any of the other five patterns of the sub-units: (3T, 4T, 3T, 4T), (4T, 3T, 4T, 3T), (4T, 3T, 3T, 4T), (3T, 3T, 4T, 4T) and (4T, 4T, 3T, 3T), in addition to the sub-patterns (3T, 4T, 4T, 3T) of FIG. 3. According to the optical recording/reproducing method of the present embodiment, when marks are recorded onto the storage medium, the sync marks (the sync information unit) of each of the frames in the sequence of data blocks are formed such that the sync marks consists of the marks of the plurality of sub-units in one of the above-mentioned six patterns.

In the optical recording/reproducing method of the present embodiment, a data signal to record a sequence of data blocks onto the storage medium is received, each data block on the storage medium having a predetermined block length from one end of the data block to the other end and being divided into a number of sync frames each of which has the sync information unit (the sync marks) that always appears at the same position within the frame with the fixed length (14T) when recording of data onto a same portion of the storage medium is repeated. When marks are recorded onto the storage medium, the sync information unit of each of the frames in the sequence of data blocks is formed such that the sync information unit consists of the marks of the sub-units. Further, each time the recording of data onto the same portion of the storage medium is repeated, the marks of the sub-units are changed by a randomly selected one of the plurality of predetermined patterns, and the entire length of the sync marks (the sync information unit) remains unchanged.

Accordingly, the recording pulse pattern of the sync marks is changed by the randomly selected one of the plurality of predetermined patterns each time the recording of data onto the same portion of the storage medium is repeated, and it is possible for the optical recording/reproducing method of the present embodiment to prevent the occurrence of a read error due to the previously-described deterioration pattern (3).

Figure 4:
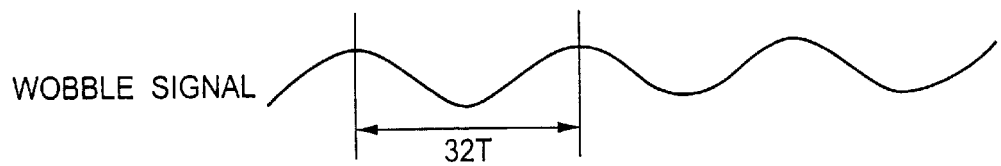
FIG. 4 is a waveform diagram for explaining a relationship between the wobble frequency and the position of the head end of one data block.

Next, a description will be provided of another preferred embodiment of the optical recording/reproducing method of the invention with reference to FIG. 4.

In order to properly reproduce recorded data from the phase-change storage medium (the DVD-rewritable) on a DVD player, it is necessary to record data blocks onto the phase-change storage medium in a seamless formation that is essentially the same as that of the read-only storage media such as DVD or DVD-ROM. In order to record data blocks onto the phase-change medium in the seamless formation, it is necessary to allow the phase of a read clock signal and the phase of a write clock signal to accurately accord with each other. Further, it is necessary to record a sequence of data blocks onto the phase-change storage medium accurately at the proper fixed positions.

FIG. 4 is a waveform diagram for explaining a relationship between the wobble frequency and the position of the head end of one data block.

Generally, the phase-change storage medium, such as a DVD-rewritable, is configured with wobble grooves which extend in a tangential track direction of the optical disk. When accessing the optical disk, a wobble signal is detected from the wobble grooves of the optical disk. The wobble signal indicates a fundamental sync information (which is called a central frequency of the wobble signal) that relates to rotation of the optical disk. The phase-change storage medium in the present embodiment is formed with the wobble grooves which create a wobble signal indicative of the central frequency corresponding to 32T, when the storage medium is accessed.

Further, the wobble signal, detected from the storage medium, carries position information of the storage medium. In an optical recording/reproducing method and apparatus of the present invention, a write clock signal is generated in response to such a position information carrying signal, such as the wobble signal, detected from the storage medium, which will be described later.

As shown in FIG. 4, the wobble signal indicates the wobble frequency that corresponds to 32T. It is necessary for the optical recording/reproducing method of the present embodiment to determine which phase of the wobble signal (32T) should accord with a start position of one data block recorded on the storage medium. Suppose that the predetermined block length of one data block (one ECC block) is equal to 619008T, and one of the 26 sync frames, contained in one of the 16 sectors of one data block, includes 32 sync bits and 1456 data bits. The predetermined block length (619008T) of one data block is a common multiple of the sync bits (32T).

If a zero-crossing point in the waveform of the wobble signal of FIG. 4 (which corresponds to a rising edge of the wobble signal) is fitted to the start position of one data block recorded on the storage medium, another zero-crossing point in the waveform of the wobble signal is also fitted to the start position of the next data block recorded on the storage medium. It is theoretically desired that the rising edge of the wobble signal (or the zero-crossing point in the waveform) accords with a start position of one data block recorded on the storage medium.

However, in practical applications, it is inevitable that there is a phase error of a read clock signal to a write clock signal produced by the wobble signal which relates to the crosstalk from wobbles of neighboring grooves in the optical disk. Further, if the phase of the read clock signal and the phase of the write clock signal are apart from each other by 180 degrees at the boundaries between adjacent data blocks, much time will be taken by the PLL operation when reproducing data from the optical disk, and a lot of data recorded at the boundaries on the optical disk will be lost during the reproducing operation.

In order to record data blocks onto the phase-change storage medium in the seamless formation, an optical recording/reproducing apparatus of one preferred embodiment of the invention is provided with a phase error correcting unit which allows the phase of a read clock signal and the phase of a write clock signal to accurately accord with each other by detecting and reducing the phase error.

In the above optical recording/reproducing apparatus, when a sequence of data blocks are written to the optical disk, the phase error between the read clock signal and the write clock signal is adjusted.

Further, the optical recording/reproducing apparatus of one preferred embodiment of the invention is configured to record a sequence of data blocks onto the phase-change storage medium accurately at the proper fixed positions.

By taking the above problem into consideration, in the optical recording/reproducing method of the present embodiment, a read clock signal is generated in response to the recorded data (the data blocks) on the phase-change storage medium. A write clock signal is generated in response to the wobble signal detected from the storage medium. There is a phase difference between the read clock signal and the write clock signal when writing data blocks to the storage medium in the seamless formation. Then, it is determined whether a phase of the write clock signal is delayed or advanced based on the phase difference, wherein a control signal to adjust a phase of the wobble signal is produced based on a result of the determination.

The basic concept of the optical recording/reproducing method of the present embodiment is essentially the same as that of one preferred embodiment of the optical recording/reproducing apparatus which is illustrated in FIG. 5 through FIG. 10.

Next, a description will be provided of one preferred embodiment of the optical recording/reproducing apparatus of the invention.

The optical recording/reproducing apparatus of the present embodiment accesses a phase change storage medium (for example, a DVD-rewritable). Hereinafter, the storage medium is also referred to as the optical disk. The optical disk, used by the optical recording/reproducing apparatus of the present embodiment, includes a disk surface portion having spiral tracks of data recorded on the recording layer of the optical disk. The spiral tracks turn in different directions around the center of the optical disk. The spiral tracks are formed with wobbling grooves on which sync bits and data bits are recorded.

Suppose that, when the optical disk used in the present embodiment is rotated at a target linear velocity, a wobble signal detected from the wobbling grooves of the optical disk is indicative of the center frequency that corresponds to 32T where T indicates a unit time period corresponding to a channel bit. The same matter has been described above with reference to FIG. 4.

Figure 6:
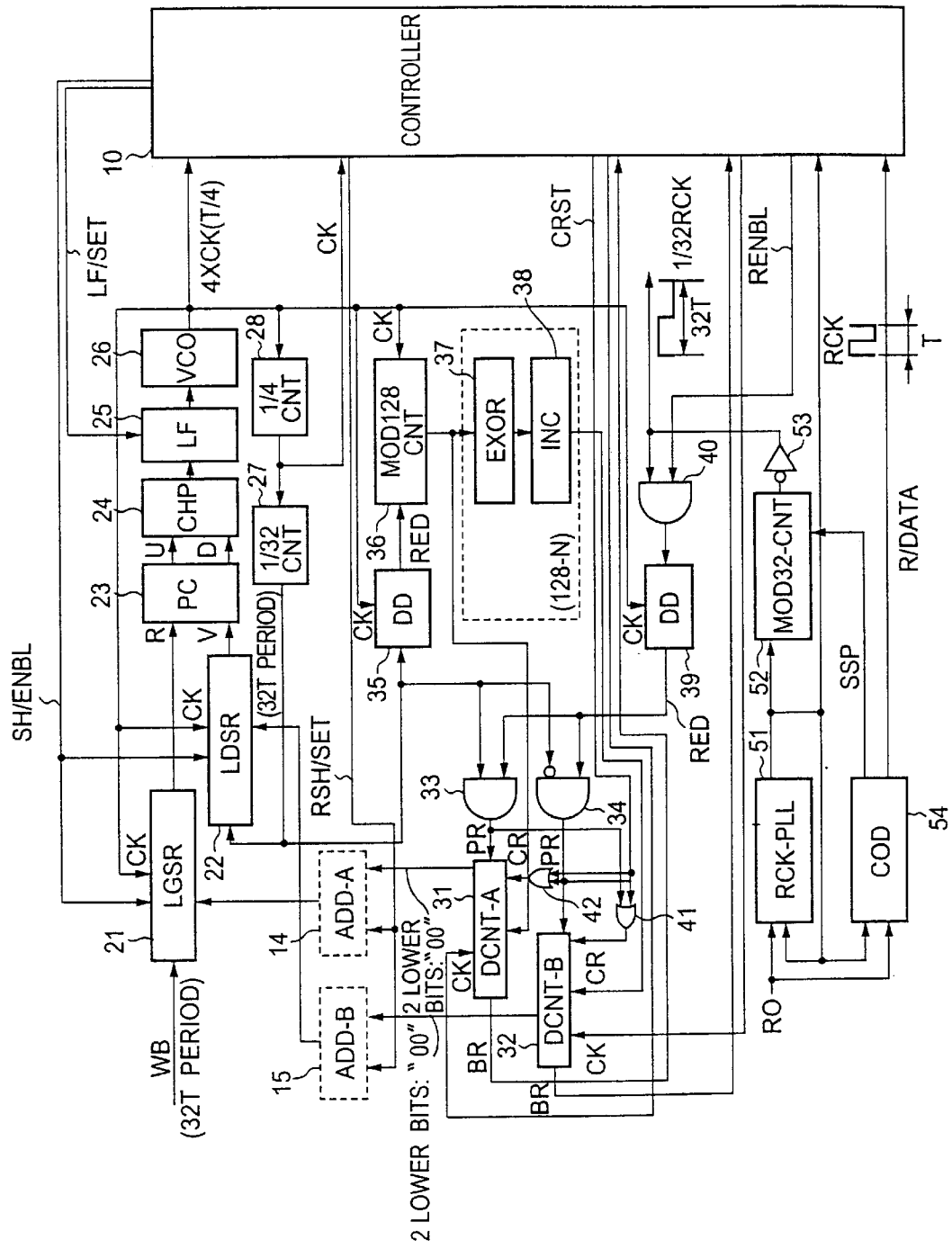
FIG. 6 is a block diagram of the essential part of one preferred embodiment of the optical recording/reproducing apparatus of the invention.

FIG. 6 is a block diagram of the essential part of one preferred embodiment of the optical recording/reproducing apparatus of the invention.

As shown in FIG. 6, the optical recording/reproducing apparatus of the present embodiment generally comprises a controller 10 and a phase-locked loop (PLL). The PLL in the present embodiment is constituted by a phase comparator (PC) 23, a charge pump (CHP) 24, a loop filter (LF) 25, and a voltage-controlled oscillator (VCO) 26. In the PLL, the phase comparator 23 has a first input R and a second input V. The VCO 26 outputs a four-fold write clock signal (4×CK) that has a four-fold frequency in comparison with a frequency of a write clock (CK). The time period of the write clock (CK) corresponds to a time period of T. The time period of the four-fold write clock signal output by the VCO 26 corresponds to a time period of T/4. The four-fold write clock signal output by the VCO 26 is also called the control clock.

When a time constant of the loop filter 25 is changed, the controller 10 outputs a loop-filter time-constant setting signal (LF/SET) to the loop filter 25, so that the time constant of the loop filter 25 is set to a controlled value indicated by the signal LF/SET.

Further, as shown in FIG. 6, the optical recording/reproducing apparatus of the present embodiment generally comprises a phase lag correcting shift register (LGSR) 21, a phase lead correcting shift register (LDSR) 22, a divide-by-32 counter (1/32CNT) 27, and a divide-by-4 counter (1/4CNT) 28.

The wobble signal (WB), detected from the wobbling grooves of the optical disk, is supplied through the LGSR 21 to the first input R of the phase comparator 23. As previously described, the center frequency of the wobble signal WB corresponds to the time period of 32T.

When the operation of the LGSR 21 and the LDSR 22 is enabled or started, the controller 10 outputs a shift-register enable signal (SH/ENBL) to each of the LGSR 21 and the LDSR 22. The operation of the LGSR 21 and the LDSR 22 is started by the control signal (SH/ENBL) supplied by the controller 10.

The four-fold write clock signal (4×CK), output by the VCO 26, is supplied to the input of the divide-by-4 counter 28. The counter 28 outputs a write clock signal (CK) that has the output frequency corresponding to the time period of T. The write clock signal (CK), output by the divide-by-4 counter 28, is supplied to the input of the divide-by-32 counter 27. Hence, the counter 27 outputs a clock signal that has the output frequency corresponding to the time period of 32T, and this clock signal (corresponding to 32T period) is supplied through the LDSR 22 to the second input V of the phase comparator 23.

In the optical recording/reproducing apparatus of the present embodiment, the LGSR 21 serves to delay a phase of the wobble signal WB sent to the first input R of the phase comparator 23, and the LDSR 22 serves to delay a phase of the 32T-period write clock signal sent to the second input V of the phase comparator 23. In other words, the LDSR 22 serves to advance the phase of the wobble signal WB.

As described above, the divide-by-4 counter 28 outputs the write clock signal (CK) having the frequency corresponding to the time period of T.

The optical recording/reproducing apparatus of the present embodiment automatically varies a phase difference between the write clock signal CK and the wobble signal WB by controlling the LGSR 21 and the LDSR 22.

Figure 5:
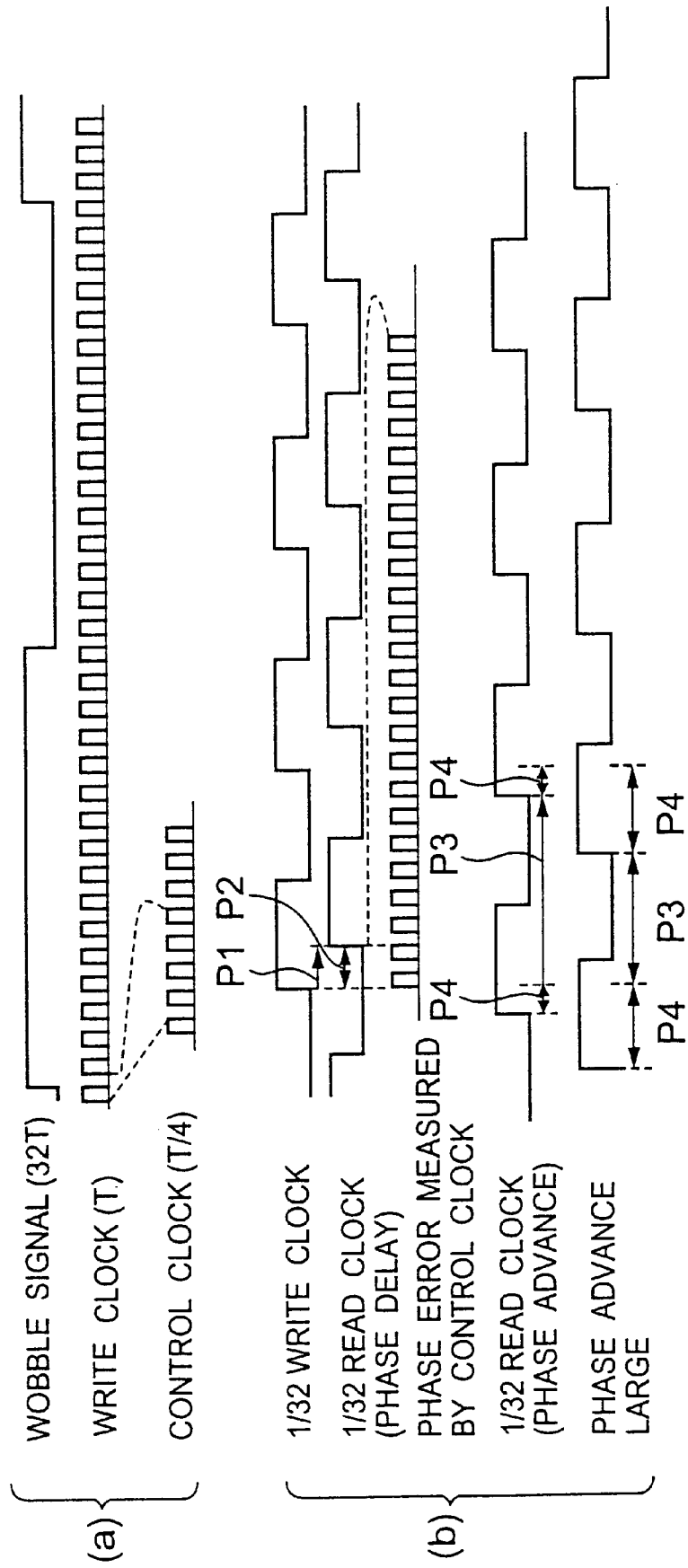
FIG. 5 is a time chart for explaining the detection of a phase error of a read clock to a write clock in one preferred embodiment of the optical recording/reproducing apparatus of the invention.

FIG. 5 is a time chart for explaining the detection of a phase error of a read clock signal to a write clock signal in the optical recording/reproducing apparatus of the present embodiment.

The time chart, indicated by (a) in FIG. 5, is provided for explaining a relationship between the 2-level wobble signal (32T period), the write clock signal (T period) and the control clock signal (T/4 period) in the optical recording/reproducing apparatus of the present embodiment. As shown, one cycle of the write clock signal is equivalent to four cycles of the control clock signal. In order to accurately detect a phase error of a read clock signal to a write clock signal, it is necessary for the optical recording/reproducing apparatus of the present embodiment to generate a 1/32 read clock signal having the time period that is the same as the time period (32T) of the wobble signal WB, from a readout signal obtained by reading the recorded data from the optical disk.

In the optical recording/reproducing apparatus of FIG. 6, a read clock generated by a phase-locked loop (RCK-PLL) 51 is provided for the detection of a phase error of the read clock signal to the write clock signal. The RCK-PLL 51 generates a read clock signal from a readout signal (RO) obtained by reading the recorded data of the optical disk.

The read clock signal, output by the RCK-PLL 51, is sent to an encoder (COD) 54. The encoder 54 receives the readout signal RO and the read clock signal, and outputs readout data by synchronizing the readout signal RO with the read clock signal. Further, the encoder 54 outputs a data block start position signal (SSP) indicating the position of the start of each of a number of data blocks of the output readout data.

Further, the read clock signal, output by the RCK-PLL 51, is sent to an input of a modulus-32 counter (MOD32-CNT) 52. The signal SSP, output by the encoder 54, is sent to another input of the modulus-32 counter 52. The modulus-32 counter 52 provides an output clock frequency that is one thirty-second the frequency of the read clock signal received at the input of the counter 52. The output of the counter 52 is reset to zero by the signal SSP, so as to fit the phase of the read clock signal to the zero-crossing point in the waveform of the wobble signal shown in FIG. 4. An inverter 53 inverts the output of the counter 52.

In the optical recording/reproducing apparatus of FIG. 6, a reproducing unit is constituted by the PLL 51 and the encoder 54. The encoder 54 serves to reproduce the data "R/DATA" from the storage medium in accordance with the read clock signal.

Hereinafter, the read clock signal output through the inverter 53 generated by the counter 52 is called 1/32 read clock signal, and the write clock signal output by the counter 27 is called 1/32 write clock signal.

The time chart, indicated by (b) in FIG. 5, is provided for explaining a method of detection of a phase error of the 1/32 read clock signal to the 1/32 write clock signal in the optical recording/reproducing apparatus of the present embodiment.

As shown in FIG. 5, when the phase of the 1/32 read clock signal is delayed from the phase of the 1/32 write clock signal, the amount of a phase difference (indicated by P1 in FIG. 5) between the two clock signals is measured by simply counting the number of cycles of the control clock signal that corresponds to the phase difference (indicated by P2 in FIG. 5).

As the frequency of the control clock signal (T/4 period) is four times the frequency of the write clock signal (T period), it is possible for the present embodiment to accurately detect the phase error of the 1/32 read clock signal to the 1/32 write clock signal. If the frequency of the control clock signal is further increased, it is possible to easily increase the accuracy of the detected phase error.

On the other hand, when the phase of the 1/32 read clock signal is advanced from the phase of the 1/32 write clock signal, the amount of a phase difference (indicated by P4 in FIG. 5) between the two clock signals is measured by counting the number of cycles of the control clock signal corresponding to a remaining portion (indicated by P3 in FIG. 5) of the 1/32 read clock signal and by calculating the amount of the phase difference P4 in accordance with the equation P4=32T−Pm where Pm indicates a time period corresponding to the count number for the remaining portion P3 of the 1/32 read clock signal. The time period Pm is measured as a time period from a rising edge of the 1/32 write clock signal to a rising edge of the 1/32 read clock signal.

Any conventional optical recording/reproducing apparatus does not provide the functions of the optical recording reproducing apparatus of the present invention that, when the read clock mode is changed to the write clock mode in the seamless formation, the position of the wobble signal be returned to the originally intended position, and the phase error between the read clock signal and the write clock signal be reduced to a level that is below 180 degrees.

If the read/write clock phase difference with respect to a data block to be recorded following a recorded data block is shifted by 180 degrees, the phase of the signal which is input to the RCK-PLL 51 greatly changes when the data reproduction is performed at the boundary between the two data blocks, which will cause the data detection error condition to continue for a long time.

Figure 10:
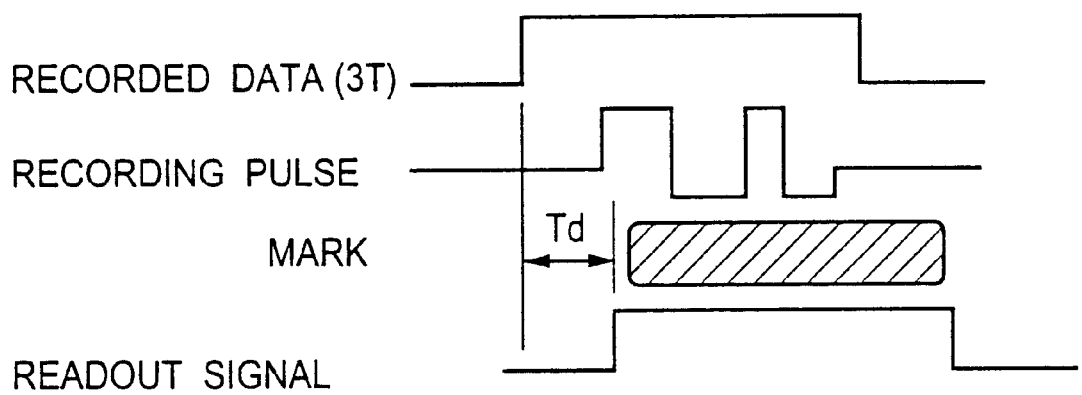
FIG. 10 is a waveform diagram for explaining a phase error between a recording pulse and a readout signal, and a phase-error period which may be revealed with the readout signal when reproducing the recorded data from the optical disk.

Further, in the optical disk of the phase-change material, the writing marks are likely to deviate from the recording pulse depending on the properties of the recording layer. The timing must be corrected by taking account of such a phase error, and the recording pulse must be generated through the correction of the timing. FIG. 10 shows a phase error between a recording pulse and a readout signal, and a phase-error period "Td" which may be revealed with the readout signal when reproducing the recorded data from the optical disk.

In order to eliminate the above problems, it is necessary to generate the writing data at a time that precedes the rising edge of the recording pulse by the period "Td" in the example of FIG. 10 during the writing of the data.

Next, a description will be provided of the SPS (start position shift). The optical recording/reproducing method that is taken for the following description is to record a sequence of data blocks onto the storage medium so that the positions of the data blocks are basically unchanged but each of the data blocks is varied in length such that fixed data bits are added to the end of the preceding data block at the head-end boundary between the preceding data block and the data block or the existing data bits are removed from the end position of the data block at the tail-end boundary between the data block and the following data block. The data bits, which are lost at the ends of the data blocks through the SPS having no link is used, will be recovered by performing the known error correcting code (ECC) process. In the present case, the maximum data bits which are lost through the SPS will amount to 1024 bits (or 1024T).

In the overwrite portions of the data blocks where the fixed data bits are added, no user information is contained. The overwrite portions may provide the information for generating the read clock signal. The problem arises when no recording information is detected at the boundaries of the data blocks. In this case, the situation is the same as a disk failure.

However, the PLL of the present embodiment is configured to hold the condition of the read clock signal, which is currently output from the PLL, when a data error with its size larger than a certain size is detected. For example, in order to accomplish the above control, the input signal to the PLL is inhibited from being sent to the PLL when a data error with its size larger than a certain size is detected.

Accordingly, if the phase difference for the current data block is adjusted, during the data recording, so as to match with the phase difference for the preceding data block, the disturbance of the RCK-PLL 51 is minimized, and the occurrence of a data detection error at the PLL when reproducing the data is greatly reduced Further, in many applications, the recorded information is often on the storage medium to which the data recording is newly performed The above-described optical recording/reproducing method is effective for such applications.

In order to use the SPS having no link, the clock generating process of the present invention is performed for the data portions which are lost. If this measure is taken, the occurrence of a data detection error at the PLL is greatly reduced, and it is possible to provide an optical recording/reproducing system with an adequately high level of reliability.

As previously described, if recording data is repeatedly written to the same data block (or the same position) on the phase-change disk, the recording properties of the disk will deteriorate and a defect at the position will take place. In such a case, if the entire data block is shifted to such an extent that the synchronization is possible, the repetitive recording characteristics of the optical disk will improve and the operative life of the optical disk will be extended. The shifting of the entire data block is performed without shifting the phase. In the optical recording/reproducing method and apparatus of the present embodiment, the phase difference of the wobble signal can be shifted, for example, by a time period ranging from 1T to 5T. If the phase difference is at this level of the number of clocks, a commonly known PLL would reach the synchronization shortly. However, when the phase of the read clock signal deviates by 180 degrees, much time will be taken until the phase of the read clock signal is returned to such a level that data can be reproduced from the optical disk. In the optical recording/reproducing method and apparatus of the present embodiment, the amount of the shifting of the phase difference within an integral multiple of T that is less than 5T (i.e., nT where n is an integer between 1 and 5) is allowed, but the shifting of the phase difference to the vicinity of 1.5 nT is inhibited to avoid the above problem.

With respect to an optical disk on which data is already recorded by an optical disk drive, in order to smoothly record data onto the disk in a seamless formation by using another optical disk drive, it is necessary to predetermine the relationship between the wobble signal phase concerning the physical format of the disk and the recording data phase.

As shown in FIG. 10, the recorded data and the actually recorded mark on the optical disk often have a phase difference. The phase difference varies depending on the individual optical disk drives, even when the same storage medium is used. Because there are variations of the phase difference among the optical disk drives, when new data is first recorded onto the storage medium on which the previous data is already recorded by the previous optical disk drive, by using a new optical disk drive, it is difficult to record the data onto the storage medium in a seamless formation.

In order to eliminate the above problem, the optical recording/reproducing method of the present invention provides a calibration process, which is executed when the optical disk is first, placed into the disk drive before new data is recorded onto the disk on that disk drive. Initially, predetermined data bits having a given block length are written to a calibration area of the disk or a vacant area of the data recording region of the disk. When the calibration process is performed, the relationship between the wobble signal phase and the recording data phase is estimated by reading out the predetermined data from the calibration area of the disk, and the correction of the phase difference is performed based on the estimated relationship when actually writing the new data to the disk on the disk drive.

Generally, the storage media, such as optical disks, are provided with a laser power calibration area in the innermost region or the outermost region of the disk, and this laser power calibration area can be shared with the above calibration process.

The optical recording/reproducing apparatus of FIG. 6 is provided with a detection unit which detects a phase error of the 1/32 read clock signal to the 1/32 write clock signal as in the above-mentioned manner. Further, the optical recording/reproducing apparatus of FIG. 6 is provided with a determination unit which determines whether the phase of the 1/32 write clock signal is delayed or advanced, based on the detected phase error. This determination is carried out under the control of the controller 10. When the 1/32 write clock signal remains at the high level at the time the 1/32 read clock signal rises, it is determined that the phase of the 1/32 read clock signal is delayed. When the 1/32 write clock signal remains at the low level at the time the 1/32 read clock signal rises, it is determined that the phase of the 1/32 read clock signal is advanced.

Specifically, in the optical recording/reproducing apparatus of FIG. 6, the above-described detection and determination units are constituted by an AND gate 33, an AND gate 34, a digital differential circuit (DD) 35, a modulus-128 counter (MOD128 CNT) 36, an EXOR gate 37, an incrementing circuit (INC) 38, a digital differential circuit (DD) 39, and an AND gate 40.

The DD 35 detects a rising edge of the 1/32 write clock signal from the counter 27, and outputs a count reset signal to the counter 36, so that the number of control clocks, counted by the counter 36, is reset to zero. At this time, the counter 36 starts counting the number of control clocks (T/4). The counter reset signal output by the DD 35 is called a rising-edge differential signal (RED). The 1/32 write clock signal is supplied to each of the AND gates 33 and 34 at the same time that it is supplied to the digital differential circuit (DD) 35.

The modulus-128 counter 36 is sometimes subjected to the overflow of counting. In practical applications, it is preferred to design the optical recording/reproducing apparatus that incorporates a counter having a capacity of more than 128 counts.

Next, the DD 39 detects a rising edge of the 1/32 read clock signal output from the AND gate 40, and outputs a rising-edge differential signal (RED) to each of the AND gates 33 and 34. At the AND gates 33 and 34, it is determined whether the 1/32 write clock signal is set to the high level or the low level at the time when the RED output by the DD 39 is received.

Further, the optical recording/reproducing apparatus of FIG. 6 is provided with a phase error correcting unit which adjusts the phase of the write clock signal in response to the control signal produced by the determination unit, so that the phase of the write clock signal is gradually changed so as to accord with the phase of the wobble signal while the data blocks are recorded onto the storage medium.

Specifically, in the optical recording/reproducing apparatus of FIG. 6, the phase error correcting unit is constituted by a first adder (ADD-A) 14, a second adder (ADD-B) 15, a down-counter (DCNT-A) 31, a down-counter (DCNT-B) 32, an AND gate 33, an AND gate 34, an OR gate 41, and an OR gate 42. The first adder 14 outputs a control signal to the LGSR 21 when a phase advance of the wobble signal is detected, so that the phase advance of the wobble signal is corrected. The second adder 15 outputs a control signal to the LDSR 22 when a phase lag of the wobble signal is detected, so that the phase lag is corrected.

In the optical recording/reproducing apparatus of FIG. 6, when the 1/32 write clock signal is set to the high level at the rising edge of the 1/32 read clock signal output, the output (the count number N of the control clocks) of the counter 36 is supplied directly to the down-counter 31. The count number N, which is supplied to the down-counter 31 at this time, indicates the amount of a phase advance of the 1/32 write clock signal.

On the other hand, when the 1/32 write clock signal is set to the low level at the rising edge of the 1/32 read clock signal output, the output (the count number N) of the counter 36 is supplied to the EXOR gate 37. The EXOR gate 37 outputs a complementary number of the count number N to the incrementing circuit 38. The incrementing circuit 38 outputs the count number (128−N) to the down-counter 32. The count number (128−N), which is supplied to the down-counter 32 at this time, indicates the amount of a phase delay of the 1/32 write clock signal.

In the optical recording/reproducing apparatus of FIG. 6, when the phase of the 1/32 write clock signal is advanced, the phase of the 1/32 write clock signal is delayed by adjusting the phase of the wobble signal. This function is carried out by the LGSR 21, the down-counter 31 and the first adder 14. When the phase of the 1/32 write clock signal is delayed, the phase of the 1/32 write clock signal is advanced by adjusting the phase of the wobble signal. This function is carried out by the LDSR 22, the down-counter 32 and the second adder 15.

In the optical recording/reproducing apparatus of FIG. 6, the first adder 14 and the second adder 15 are controlled by the controller 10 so as to shift, at random, the time of writing one data block to the optical disk by any of a plurality of periods 1T, 2T, . . . nT. Before one data block is written to the optical disk, the controller 10 outputs a random-shifting setting signal (RSH/SET) to the first adder 14 or the second adder 15. The amount of the random shifting by the first adder 14 or the second adder 15 is determined by this control signal (RSH/SET). During the writing of the data block, the amount of the random shifting is unchanged.

The optical recording/reproducing apparatus of the present embodiment is effective in improving the repetitive recording characteristics of the optical disk and in extending the operative life of the optical disk.

The controller 10 supplies the control signal (RSH/SET) to each of the first adder 14 and the second adder 15 when it is needed to set the amount of the random shifting to a controlled value.

In the present embodiment, the two least significant bits of the signals, output by the down-counters 31 and 32, represents the period corresponding to one fourth of the unit period T. The two least significant bits (LSBs) of the control signal (RSH/SET) are always set to zero "00". The controller 10 inhibits the two LSBs of the output signals of the first adder 14 and the second adder 15 from being changed. If such bits are changed, it is highly possible that the phase of the writing data is delayed or advanced by 180 degrees. This is detrimental to accurately synchronize the phase of the write clock signal when contiguous ECC blocks are reproduced.

Further, the optical recording/reproducing apparatus of FIG. 6 may be modified so that a phase error of the 1/32 read clock signal (1/32 RCK) to the wobble signal (WB) is reduced. In the modified optical recording/reproducing apparatus, the output of the DCNT-A 31 and the output of the DCNT-B 32 are supplied to the LGSR 21 and the LDSR 22. It is readily understood that this modification makes it possible to adjust the phase of the 1/32 read clock signal, which is obtained from recorded data produced with the write clock signal after the phase error correction, so as to approach the phase of the wobble signal.

As shown in FIG. 10, in the optical recording/reproducing method and apparatus of the present invention, a recording pulse is generated in response to the recorded data based on the wobble signal detected from the optical disk. In the example of FIG. 10, the recording pulse has a period of 3T which corresponds to the smallest length according to the data format of the DVD-rewritable in the present embodiment. Generally, when reproducing the recorded data from the optical disk, a phase error of a readout signal (which is generated in response to the recorded mark of the optical disk) relative to the recording pulse is produced as shown in FIG. 10.

In order to properly reproduce the recorded data from the optical disk, it is necessary for the optical recording/reproducing method of the present embodiment to accurately detect the phase error of the readout signal having relation to the 1/32 read clock signal to the recording pulse having relation to the 1/32 write clock signal and to reduce a phase error period (indicated by "Td" in FIG. 10) of the readout signal as small as possible, or to zero by adjusting timing of the recording pulse. For this purpose, in the optical recording/reproducing method of the present embodiment, the calibration process is performed when the optical disk is first placed into the disk drive before data is recorded on the disk.

During the calibration process, predetermined data bits are initially written to a given calibration area of the optical disk, and a readout signal are generated in response to the recorded data by reading the recoded data from the optical disk, so that the phase error of the readout signal relative to the phase of the recording pulse is detected.

Alternatively, the calibration process for the phase correction may be performed simultaneously with the time the laser power calibration process is performed, in order to eliminate the influences due to the fluctuation of the environmental conditions of the optical disk drive or the fluctuation of the surface conditions of the optical disk. Or the calibration process for the phase correction may be performed at intervals of a given period or at given positions on the surface of the optical disk.

In the optical recording/reproducing apparatus of FIG. 6, before starting execution of the calibration process, the controller 10 initially sets the read enable signal (RENBL) in OFF state (the DD 39 outputting no pulse RED), and initially sets a count reset signal (CRST) in ON state (the count values of the down-counters 31 and 32 being reset to zero). As shown in FIG. 6, the control signal RENBL is delivered from the controller 10 to the AND gate 40, and the control signal CRST is delivered from the controller 10 to the down-counters 31 and 32 via the OR gates 41 and 42.

In the above initialized condition, the delay time of the clock signal, output by the shift register 21 or 22 and sent to the phase comparator 23, is set to zero.

After the optical recording/reproducing apparatus of the present embodiment is set in the initialized condition, the controller 10 starts the execution of the calibration process for the storage medium. As described above, the predetermined data bits are initially written to the calibration area of the storage medium. When reading the data from the storage medium, the controller 10 sets the control signal RENBL in ON state, and the AND gate 40 is opened. During the reading process, the phase comparison of the 1/32 read clock signal and the 1/32 write clock signal is performed.

As described above, at this time, the controller 10 sets the shift-register enable signal (SH/ENBL) in OFF state (the shift registers 21 and 22 being set in the disabled state), and the delay time of the clock signal, output by the shift register 21 or 22 and sent to the phase comparator 23, is set to zero.

When an appropriate time period has elapsed after the start of the above reading process, the phase error period Td is measured. At the end of the measurement of the period Td, the controller sets the control signal (RENBL) in OFF state, and the reading process is terminated.

By performing the above-described calibration process, the phase lag count of the readout data is set to the down-counter 31, or the phase lead count of the readout data is set to the down-counter 32. The output value of the down-counter 31 or the output value of the down-counter 32 is supplied to the controller 10 through a bus line (not shown in FIG. 6).

For example, when the phase of the read clock signal is delayed, the controller 10 causes the phase of the recording pulse (shown in FIG. 10) to advance by an appropriate time period.

Alternatively, the phase adjustment of the recording pulse may be performed by the controller 10 such that the control signal RSH/SET, sent to the first and second adders 14 and 15, is set so as to obtain an appropriate amount of the shifting by the first and second adders 14 and 15.

Generally, the phase error period Td is less than the unit period T. In such a case, the two LSBs of the control signal RSH/SET, which may be set to a suitable value, are added to the output signals of the down-counters 31 and 32. The phase control will be subsequently performed by using this value as an offset value.

Alternatively, the phase difference between the 1/32 read clock signal and the wobble signal may be eliminated as follows. In such alternative embodiment, which is not shown in FIG. 6, the output signal of the down-counter 31 is delivered directly to the shift register (LDSR) 22 while the output signal of the down-counter 32 is delivered directly to the shift register (LGSR) 21, so that the phase difference between the 1/32 read clock signal and the wobble signal is eliminated. It is readily understood that the 1/32 read clock signal, which is obtained with the readout signal of data written to the disk by the write clock signal after the phase difference correction is done by the shift registers 21 and 22, will have the phase that is in close vicinity to the phase of the wobble signal.

In the above-described embodiment of FIG. 6, both the phase lag correcting shift register (LGSR) 21 and the phase lead correcting shift register (LDSR) 22 are used for the phase difference correction. Alternatively, if the phase difference correction (or the phase delaying effect for the wobble signal) by the shift register (LGSR) 21 is deferred for a time period corresponding to the period of the wobble signal, the phase difference between the 1/32 read clock signal and the wobble signal can be eliminated in the same manner as in the above-mentioned alternative embodiment, without using the shift register (LDSR) 22. This is because the effect of the phase delay of "180+a" degrees is equivalent to the effect of the phase advance of "180−a" degrees. In addition, it is readily understood that, if the phase difference correction (or the phase advancing effect for the wobble signal) by the shift register (LDSR) 22 is deferred for a time period corresponding to the period of the wobble signal, the phase difference between the 1/32 read clock signal and the wobble signal can be eliminated in the same manner, without using the shift register (LGSR) 21.

In the optical recording/reproducing method and apparatus of the present embodiment, the optical disk drive is calibrated, as described above, when the optical disk is first placed into the disk drive, so that a phase error of the readout signal having relation to the 1/32 read clock signal relative to a phase of the recording pulse having relation to the 1/32 write clock signal is detected. After the phase error is detected, the phase of the recording pulse is adjusted so as to reduce the phase error of the readout signal by using the optical recording/reproducing apparatus of FIG. 6.

Further, in the optical recording/reproducing method of the present embodiment, when a data block is first written to the optical disk, at least the calibrating and adjusting steps are performed before the writing of the data block to the optical disk.

Figure 8:
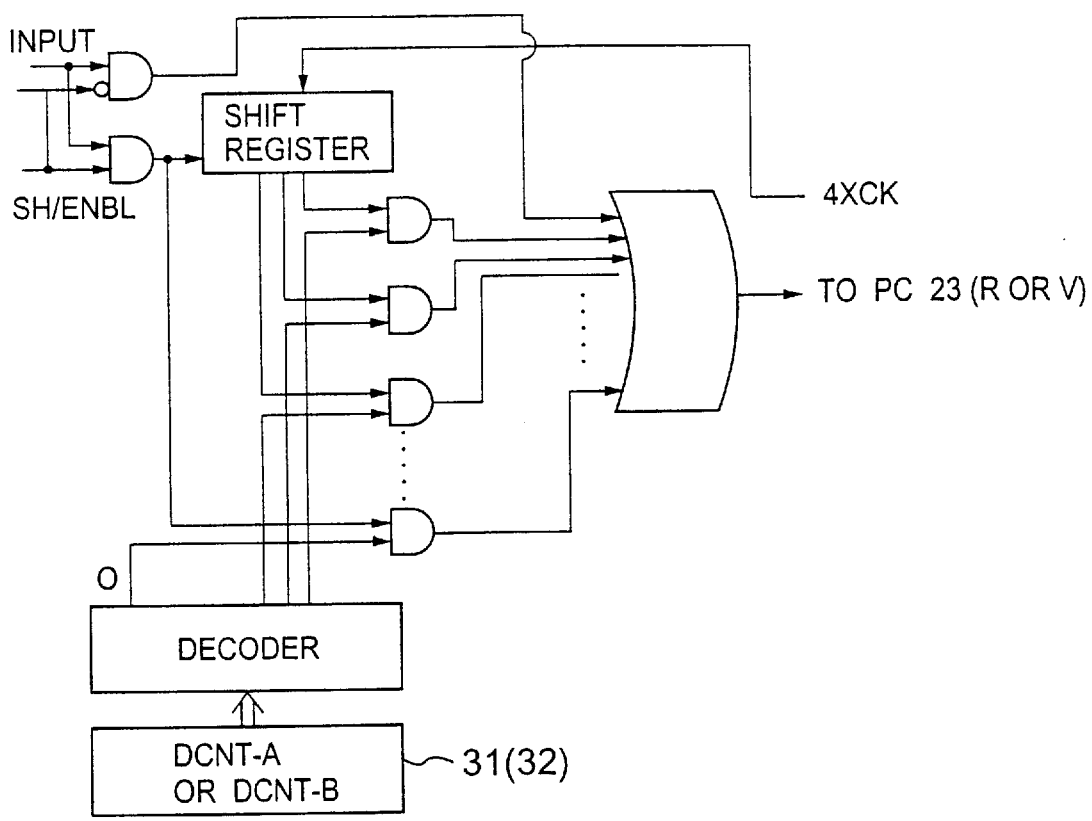
FIG. 8 is a circuit diagram of another example of the phase lead/lag correcting shift registers in the optical recording/reproducing apparatus of FIG. 6.

FIG. 8 shows an example of the phase lead correcting shift register (LDSR) 22 or the phase lag correcting shift register (LGSR) 21 in the optical recording/reproducing apparatus of FIG. 6.

As shown in FIG. 8, the phase lead/lag correcting shift register of the present example includes a shift register, a plurality of AND gates, and an OR gate.

In the optical recording/reproducing apparatus of FIG. 6, the controller 10 enables the shift registers 21 and 22 by setting the shift-register enable signal (SH/ENBL) in ON state. The instant at which the shift register 21 or 22 is enabled by the controller 10 is the same as the instant at which the read enable signal (RENBL) is disabled by the controller 10. When the shift register 21 or 22 is enabled by the controller 10, the delay time determined by the output of the down-counter (DCNT-A 31 or DCNT-B 32) is supplied to the shift register. In other words, when the comparison with the read clock signal is interrupted after the end of the phase measurement, the controller 10 enables the shift register 21 or 22.

When the shift-register enable signal SH/ENBL from the controller 10 is set in OFF state, the input signal (the wobble signal or the 1/32 write clock signal) to the phase lead/lag correcting shift register of FIG. 8 is delivered to the phase comparator (PC) 23 without delay.

When the shift-register enable signal SH/ENBL is set in ON state, the input signal is supplied to the shift register of FIG. 8, and the shift register outputs a number of bit-delayed signals to the AND gates in response to the clock signal 4×CK (T/4 period). The output of the down-counter (DCNT-A 31 or DCNT-B 32) is supplied to the decoder, and the decoder selects one of the AND gates in accordance with the value supplied by the down-counter. The selected one of the AND gates supplies a phase-shifted signal, the phase of which is delayed in accordance with the output of the down-counter, through the OR gate to the phase comparator (PC) 23. The PC 23 receives either the output signal of the shift register 21 at its first input "R" or the output signal of the shift register 22 at its second input "V".

In the optical recording/reproducing apparatus of FIG. 6, the signal supplied to the preset input (PR) of the down-counter (DCNT-A) 31 is supplied, at the same time, to the clear input (CR) of the down-counter (DCNT-B) 32. That is, when the phase lag correcting information is sent to the down-counter 31, there is no need to send the phase lead correcting information to the down-counter 32.

Similarly, in the optical recording/reproducing apparatus of FIG. 6, the signal supplied to the preset input (PR) of the down-counter (DCNT-B) 32 is supplied, at the same time, to the clear input (CR) of the down-counter (DCNT-A) 31. This is because, when the phase lead correcting information is sent to the down-counter 32, there is no need to send the phase lag correcting information to the down-counter 31.

When reproducing the recorded data from the storage medium, the read enable signal (RENBL) is set in ON state by the controller 10, and the phase adjustment of the read clock signal and the write clock signal (generated by using the wobble signal) is carried out in the optical recording/reproducing apparatus of the present embodiment as described above.

When writing a sequence of data blocks to the storage medium in a seamless formation following the position of the previously recorded data block, the read enable signal (RENBL) is first set in OFF state by the controller 10, and the phase comparison of the 1/32 read clock signal and the write clock signal is stopped.

Then, the controller 10 sets the shift-register enable signal (SH/ENBL) in ON state, so that the phase adjustment of the write clock signal is performed in the optical recording/reproducing apparatus of the present embodiment.

The controller 10 controls the above phase adjustment such that the phase locking is suitably completed by the PLL before the write start position is reached.

The delay value (or the count value), which is set to the down-counter 31 or 32 when the phase comparison is stopped, is retained in the down-counter 31 or 32. By using the write clock signal produced in the above condition, the writing of the new data blocks to the storage medium is started by the controller 10 immediately after the position of the tail end of the recorded data block on the storage medium is detected. The controller 10 executes the above-described control process, and the phase error between the read clock signal and the write clock signal can be reduced to a very small value that is below 180 degrees.

However, if the writing of the subsequent data blocks to the storage medium is continued with the retained delay value, the phase of the writing clock signal remains shifted from the phase of the wobble signal detected from the storage medium.

To eliminate the above problem, the controller 10 controls the down-counter 31 or 32 such that the output value of the down-counter 31 or 32 gradually approaches to zero until the writing of one data block (for example, one ECC block) to the storage medium is complete. The controller 10 executes the above-described control process, and the phase difference between the writing clock signal and the wobble signal will meet the predetermined relationship.

Accordingly, even if the writing of a sequence of data blocks to the storage medium in a seamless formation following the position of the previously recorded data block is performed by the optical recording/reproducing apparatus of the present embodiment, the occurrence of a data detection error when reproducing the data on a different optical disk drive is greatly reduced.

When the above-mentioned control process is performed, the controller 10 outputs a pulsed signal to the clock input (CK) of the down-counter 31 or the clock input (CK) of the down-counter 32. Until the writing of one data block to the storage medium is complete, the controller 10 continues to output the pulsed signal to the down-counter 31 or 32 so that the output value of the down-counter 31 or 32 gradually approaches to zero.

In the optical recording/reproducing apparatus of FIG. 6, the output (BR) of the down-counter 31 or the output (BR) of the down-counter 32 is used to send a BR signal to the controller 10, in order to notify the controller 10 that the output value of the down-counter 31 or 32 is set to zero.

When the BR signal from the down-counter 31 or 32 is received at the controller 10, the controller 10 stops outputting the pulsed signal to the down-counter 31 or 32.

As previously described, in the optical recording/reproducing apparatus of FIG. 6, the controller 10 increases the time constant of the loop filter 25 in the write clock generating PLL during the writing of data to the storage medium. The setting of the time constant of the loop filter 25 to an increased value is performed by the controller 10 by outputting the signal (LF/SET) to the loop filter 25.

During the writing, the phase adjustment of the write clock signal and the wobble signal is performed by using the down-counter 31 or 32, and the above control process of the controller 10 is performed in order to prevent the abrupt change of the write clock phase and moderate the change of the write clock phase.

Figure 7:
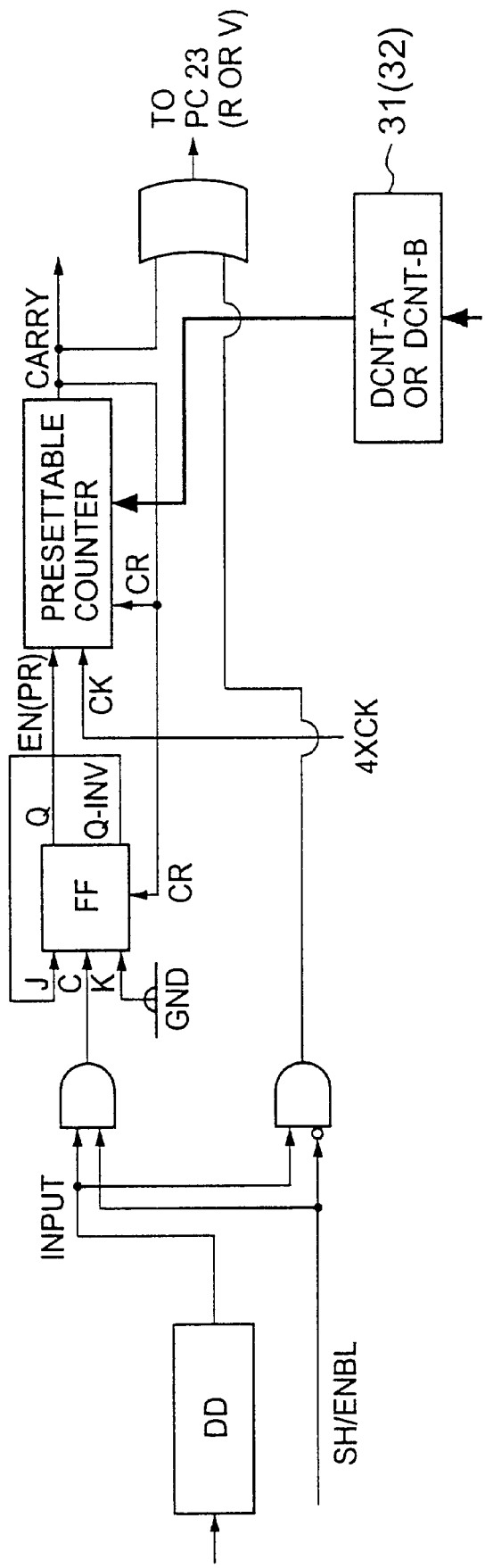
FIG. 7 is a circuit diagram of one example of a phase lead correcting shift register and a phase lag correcting shift register in the optical recording/reproducing apparatus of FIG. 6.

FIG. 7 shows another example of the phase lead correcting shift register or the phase lag correcting shift register in the optical recording/reproducing apparatus of FIG. 6.

As shown in FIG. 7, the phase lead/lag correcting shift register of this example is constructed in a simplified manner by using a presettable counter. The phase lead/lag correcting shift register of this example includes the presettable counter, a flip-flop (FF), AND gates, the digital differential circuits (DD), and an OR gate.

When the shift-register enable signal SH/ENBL from the controller 10 is set in the disable state, the input signal to the phase lead/lag correcting shift register of FIG. 6 is sent to the phase comparator (PC) 23 without delay.

When the shift-register enable signal SH/ENBL is set in the enable state, the input signal (or the output of the digital differential circuit) is sent to the flip-flop. The flip-flop is set by the input signal to supply an enable signal to the presettable counter. The presettable counter at this time is set in the enable state so that the output of the down-counter (DCNT-A 31 or DCNT-B 32) is placed to the presettable counter.

When the number of cycles of the write clock signal 4×CK counted by the presettable counter reaches the value supplied by the down-counter, the presettable counter outputs a carry signal. In other words, the presettable counter supplies a clock signal, the phase of which is delayed in accordance with the output of the down-counter, through the OR gate to the phase comparator 23. At the same time, the carry signal is sent back to both the flip-flop and the presettable counter. The flip-flop and the presettable counter are reset to wait for receiving the following input signal.

In the present example, a pulsed clock signal is input to the phase comparator 23. The phase comparator 23 uses a known phase comparator that is capable of comparing the phases of pulsed clock signals.

Figure 9:
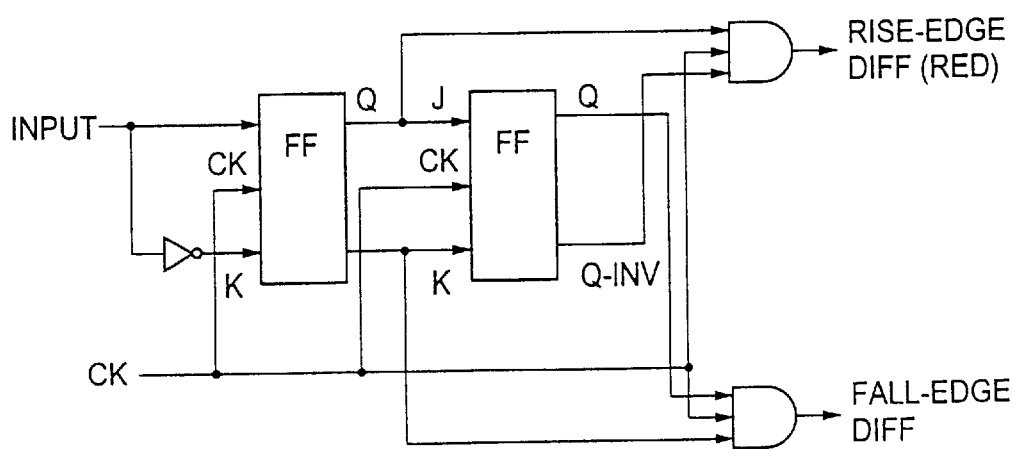
FIG. 9 is a circuit diagram of a digital differential circuit in the optical recording/reproducing apparatus of FIG. 6.

FIG. 9 is a circuit diagram of the digital differential circuit in the optical recording/reproducing apparatus of FIG. 6.

As shown in FIG. 9, the digital differential circuit (DD) of this example includes a first flip-flop (FF), a second flip-flop (FF), a first AND gate, and a second AND gate. The input signal to the digital differential circuit of FIG. 9 is supplied to the first flip-flop. The first flip-flop outputs a signal Q to both the second flip-flop and the first AND gate in response to the clock signal CK. Further, the second flip-flop outputs a delayed signal Q to the second AND gate and outputs an inverted delayed signal Q-INV to the first AND gate in response to the clock signal CK. The first AND gate outputs a rising-edge differential signal RED in response to the clock signal CK. In the present example, the first AND gate outputs a pulsed signal RED by receiving the clock signal CK.

The optical recording/reproducing method and apparatus of the above-described embodiments are effective in accurately recording data blocks onto the phase-change disk in a seamless formation and in reducing the deterioration of the recording properties of the disk. Further, by performing the above-mentioned calibration process, it is possible for the optical recording/reproducing method of the present invention to suitably detect the phase error of the readout signal to the recording pulse and reduce the phase error period Td of the readout signal which may be revealed. In addition, the recording process of the optical recording/reproducing method and apparatus of the above-described embodiments is effective in restarting the writing of data blocks to the optical disk from the portion thereof where the recorded data blocks are interrupted.

For example, when the writing of one of the data blocks to the optical disk has been interrupted by a certain problem of the disk drive, the optical recording/reproducing method and apparatus of the present invention are also effective in restarting the writing of the data blocks by a different disk drive from the interrupted position and in accurately recording that data block onto the optical disk in the seamless formation in case of the write-once read-many (WORM) media.

Further, by performing the above-mentioned calibration process such that the predetermined data bits are written to the calibration area of the optical disk, it is possible for the optical recording/reproducing method of the present invention to increase the compatibility of the phase-change storage media, such as the DVD-rewritable disk, between different disk drives.

Further, it is possible for the optical recording/reproducing method and apparatus of the present invention to perform the above-mentioned calibration process in a repeated manner until the phase error of the readout signal to the wobble signal is reduced to a desired level. In such a case, it is possible to more effectively reduce the phase error period Td of the readout signal.

Further, the phase-change disk, used by the optical recording/reproducing method of the present invention, includes a laser power calibration area provided in the innermost or outermost region of the disk to determine a power of a laser light source, and the laser power calibration area of the disk is shared with the above calibration process.

The present invention is not limited to the above-described embodiments, and variations and modifications may be made without departing from the scope of the present invention.

Further, the present invention is based on Japanese priority applications No.11-105476, filed on Apr. 13, 1999, the entire contents of which are hereby incorporated by reference.

What is claimed is:

1. An optical recording/reproducing method for accessing an optical storage medium in which binary data are recorded by applying a light beam to a recording layer of the storage medium and changing a state of the recording layer on a disk drive, comprising the steps of:

generating a read clock signal in response to recorded data on the storage medium;

generating a write clock signal in response to a position-information carrying signal detected from the storage medium;

detecting a phase difference between the read clock signal and the write clock signal when writing data blocks to the storage medium in a seamless formation; and determining whether a phase of the write clock signal is delayed or advanced based on the phase difference, wherein a control signal to adjust a phase of the position-information carrying signal is produced.

2. An optical recording/reproducing apparatus for accessing an optical storage medium in which binary data are recorded by applying a light beam to a recording layer of the storage medium and changing a state of the recording layer, comprising:

a read clock generating unit for generating a read clock signal in response to recorded data on the storage medium;

a write clock generating unit for generating a write clock signal in response to a position-information carrying signal detected from the storage medium;

a detection unit for detecting a phase difference between the read clock signal and the write clock signal when writing data blocks to the storage medium in a seamless formation; and a determination unit for determining whether a phase of the read clock signal is delayed or advanced based on the phase difference detected by the detection unit, wherein the determination unit produces a control signal to adjust a phase of the position-information carrying signal.

3. The optical recording/reproducing apparatus of claim 2, further comprising a phase error correcting unit which adjusts the phase of the write clock signal in response to the control signal produced by the determination unit, so that the phase of the write clock signal is gradually changed to accord with the phase of the position information carrying signal, and data blocks are recorded onto the storage medium.

* * * * *